United States Patent [19]

Bradley

[11] Patent Number: 4,844,684
[45] Date of Patent: Jul. 4, 1989

[54] POWER CONVEYOR PARTICULARLY FOR TRUCK TRAILERS

[75] Inventor: James H. Bradley, Lenexa, Kans.

[73] Assignee: K. C. Industrial Constructors, Inc., Kansas City, Mo.

[21] Appl. No.: 142,716

[22] Filed: Jan. 11, 1988

[51] Int. Cl.[4] .............................. B60P 1/34; B60P 1/52
[52] U.S. Cl. .................................. 414/528; 198/809; 414/529
[58] Field of Search ............... 414/528, 529, 531, 532, 414/535, 523, 525.1; 198/721, 725, 809

[56] References Cited

U.S. PATENT DOCUMENTS

| | | | |
|---|---|---|---|
| 2,087,846 | 7/1937 | John | 414/529 |
| 2,672,993 | 3/1954 | Lee | 414/529 |
| 3,018,873 | 1/1962 | Burt | 198/809 X |
| 3,052,339 | 9/1962 | Carter | 198/809 X |
| 3,104,007 | 9/1963 | Swezey et al. | 198/809 |
| 3,168,205 | 2/1965 | Green | 414/535 |
| 3,191,747 | 6/1965 | Pollard | 198/809 X |
| 3,493,095 | 2/1970 | Messerly | 198/809 X |
| 3,631,964 | 1/1972 | Hinman et al. | 198/789 |
| 3,709,450 | 1/1973 | Watts et al. | 410/79 |
| 3,756,374 | 9/1973 | Burt et al. | 198/809 X |
| 3,937,338 | 2/1976 | Cox | 414/528 |
| 4,082,196 | 4/1978 | Lutz et al. | 414/521 |
| 4,089,399 | 5/1978 | Webb | 193/35 SS |
| 4,204,592 | 5/1980 | Lutz et al. | 198/750 |
| 4,306,830 | 12/1981 | leDuc | 414/529 X |
| 4,372,441 | 2/1983 | Krammer | 198/781 |

FOREIGN PATENT DOCUMENTS 258125 1/1965 Australia .................. 414/535

OTHER PUBLICATIONS

Hydrarall MK. VIII Series 2 Brochure, 1985.
Hydrarall Pneumatic Roller Track Brochure, 1976.

*Primary Examiner*—David A. Bucci
*Attorney, Agent, or Firm*—Wm. Bruce Day

[57] ABSTRACT

A conveyor arrangement is particularly adapted for use in tractor trailers and utilizes a pair of free conveyors extending parallel and generally mounted to the trailer floor adjacent the trailer sidewalls. An elongate powered conveyor extends parallel to the free conveyors and is mounted medially on the tractor floor. The powered conveyor includes an upwardly shiftable platform which rides longitudinally upwardly and downwardly on ramps and is moved thereon by a linear actuator including a leverage arm and linkage. A continuous conveyor chain travels about the upwardly and downwardly shiftable platform and is driven by a motor and sprocket arrangement. The chain drive motor and the linear actuator for causing upward shifting are housed in an enclosure located beneath the tractor trailer floor and which is accessible from beneath the trailer for maintenance.

6 Claims, 4 Drawing Sheets

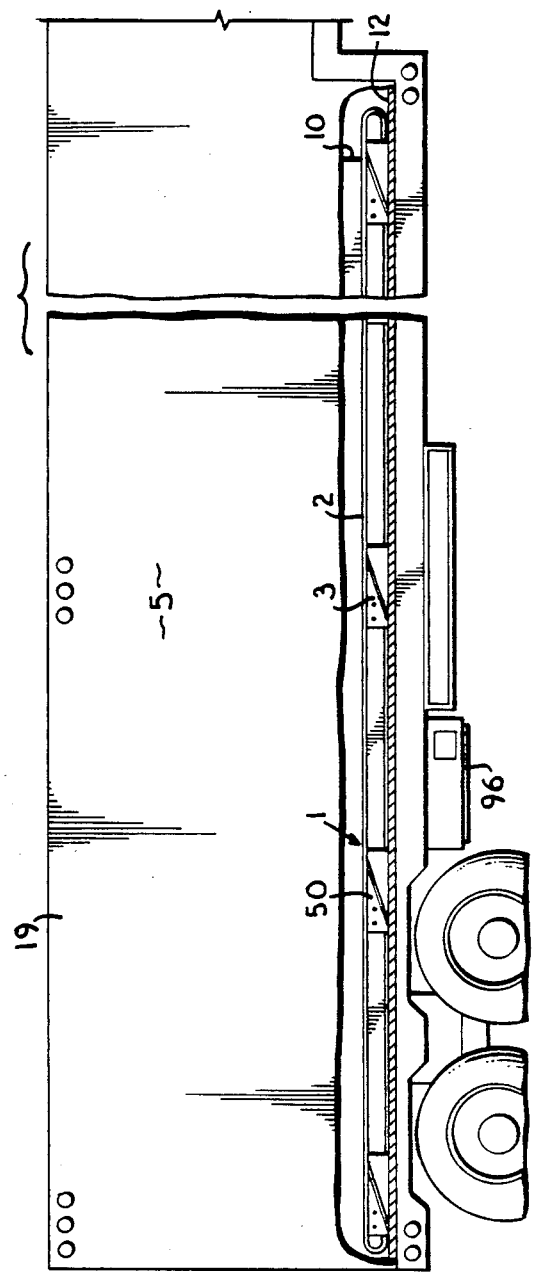
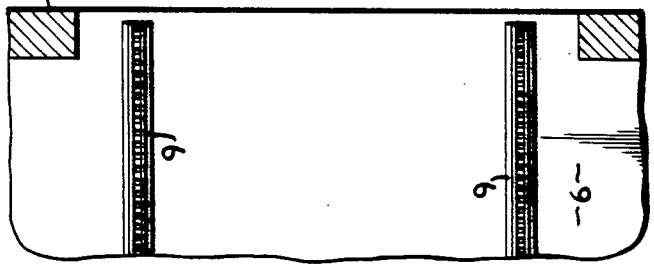

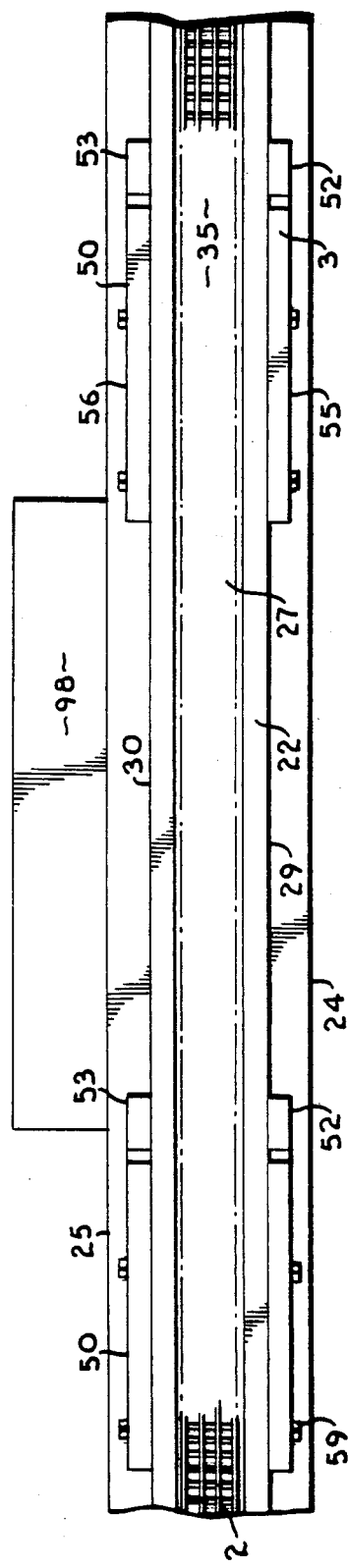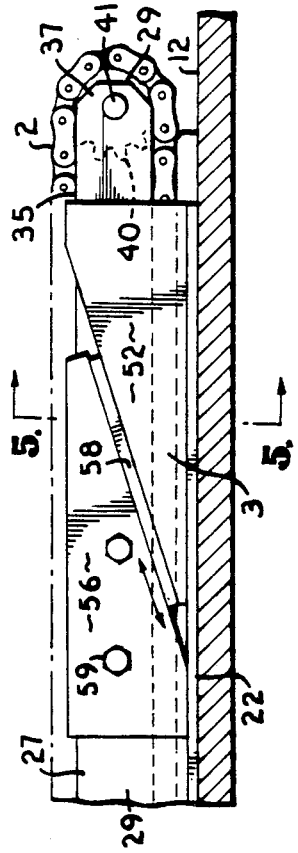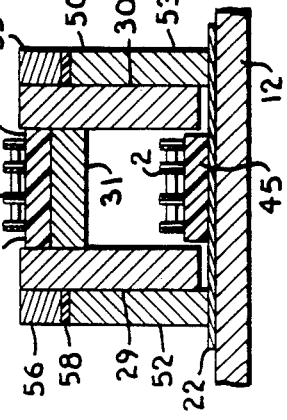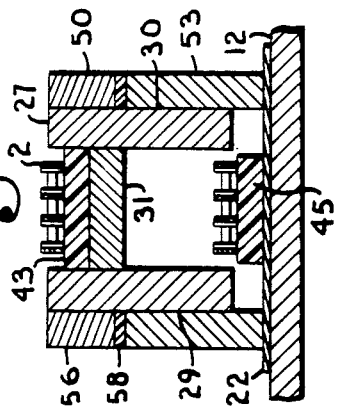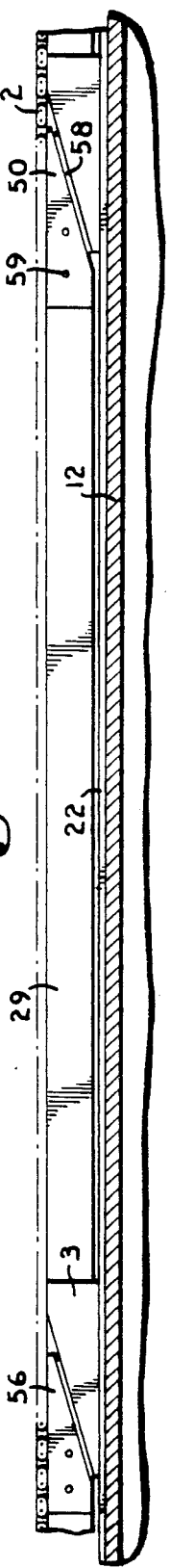

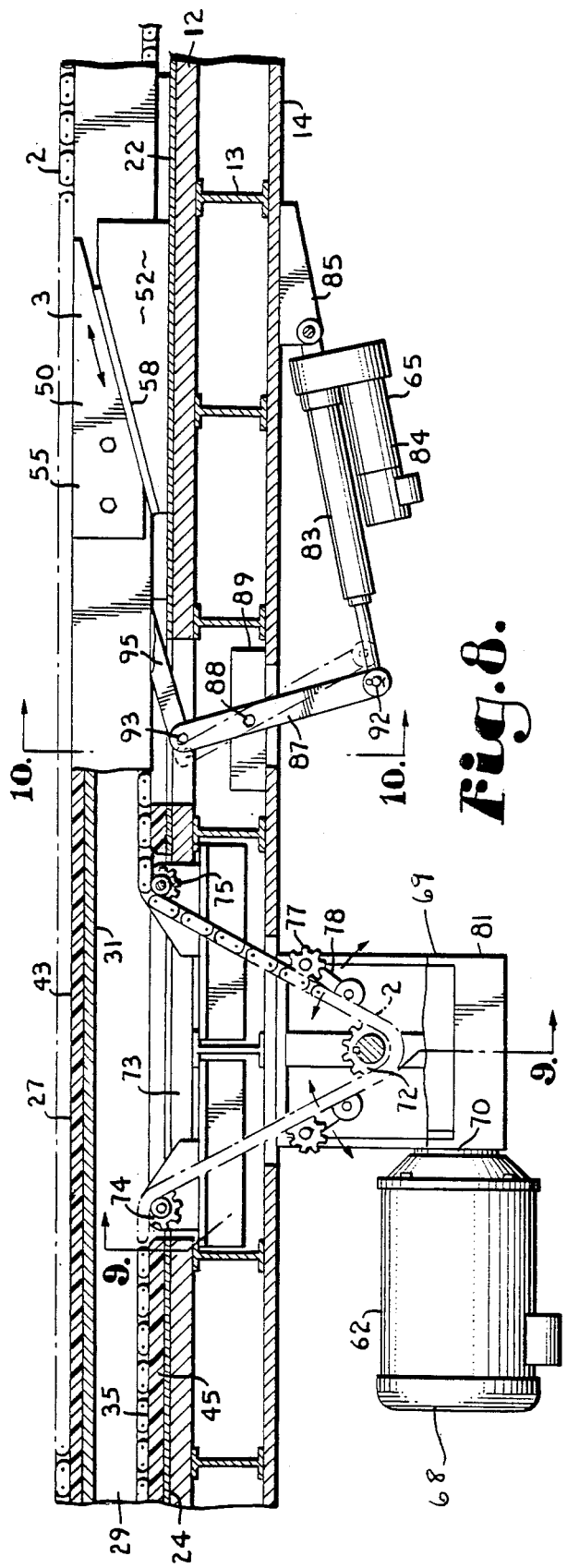
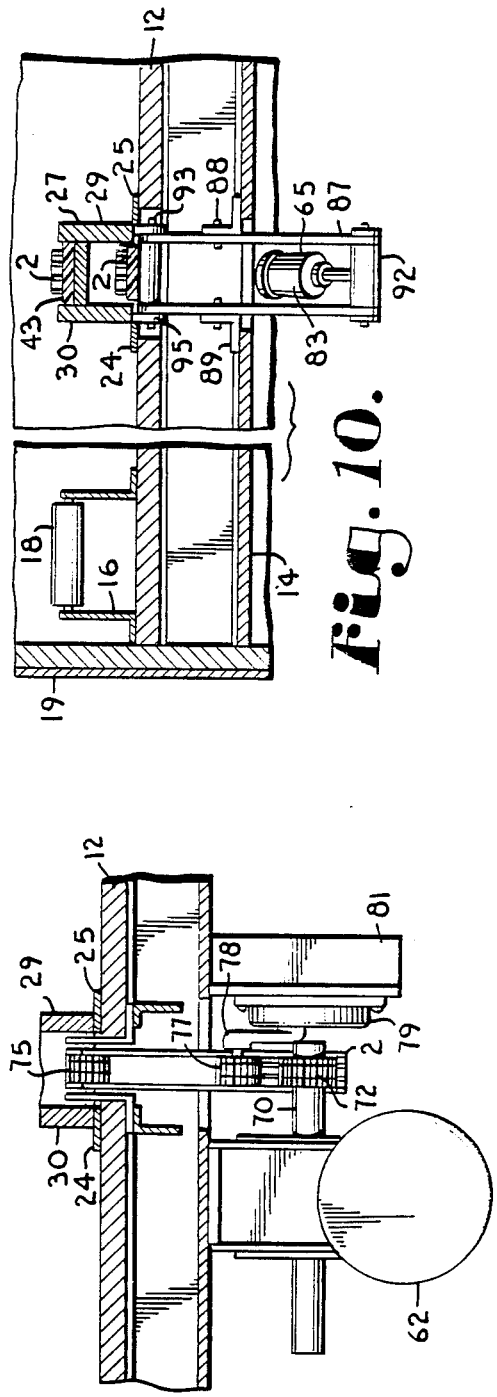

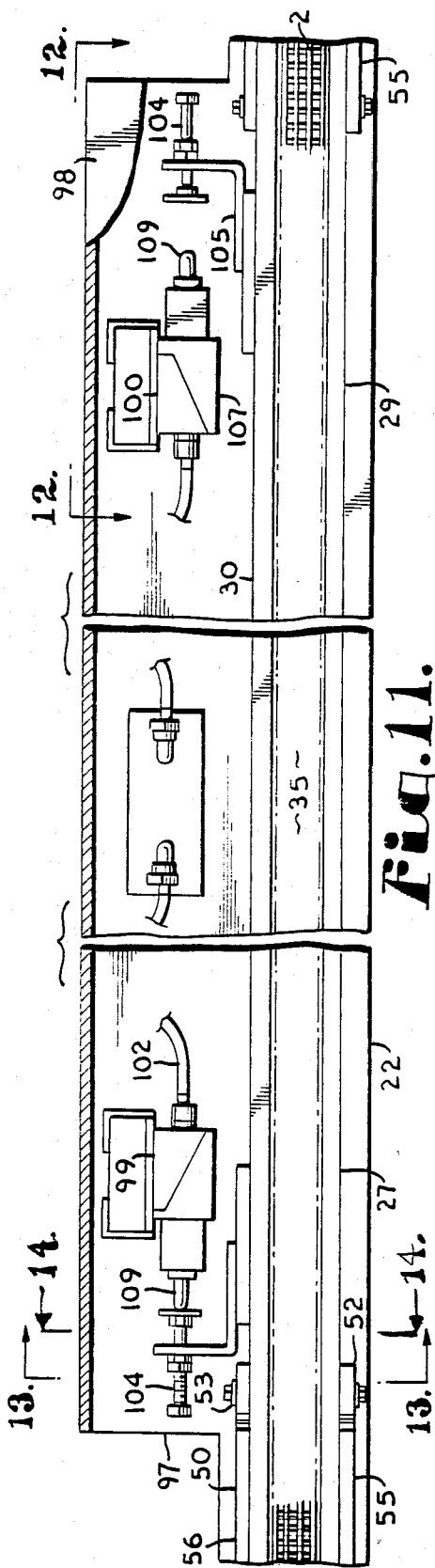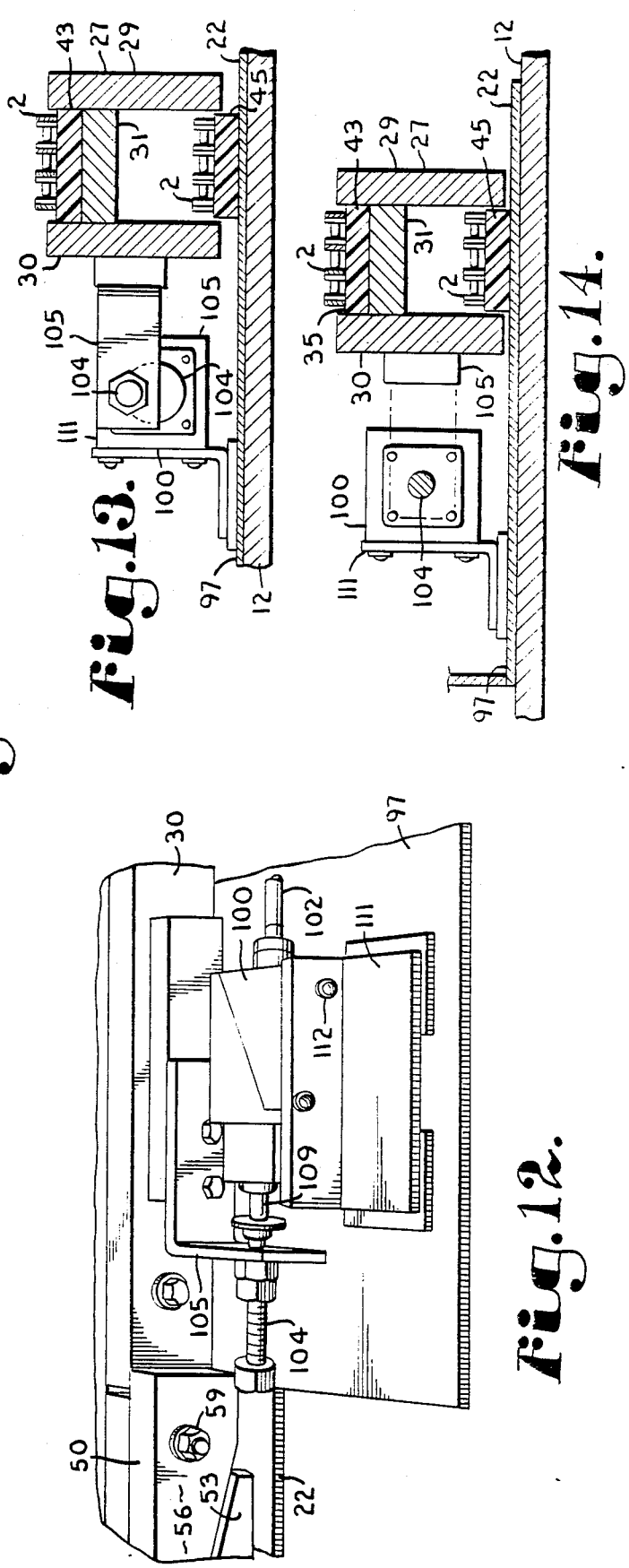

_4,844,684_

POWER CONVEYOR PARTICULARLY FOR TRUCK TRAILERS

FIELD OF THE INVENTION

This invention relates to a powered conveyor and in particular, to a powered conveyor which is adapted for use with truck trailers.

BACKGROUND OF THE INVENTION

Loading and unloading of truck trailers has commonly been practiced manually or with the assistance of various specialized types of forklifts as material handling equipment. These procedures are normally time consuming, expensive and potentially damaging to the goods within the trailer. Moreover, manual handling increases the risk of pilferage, particularly of consumer goods. With the advent of the so-called just-in-time inventory control and management system, the need has arisen for automated handling of trailer carried goods. For example, the automotive manufacture industry is an extensive user of the just-in-time inventory system and requires such components as interior and exterior panels which are placed on racks that are particularly sized and configured for use in the in-plant conveyor material handling system. The racks carrying the panels are typically too large to be manipulated by hand and a forklift and driver unloading operation may be too slow to keep pace with the plant needs. During plant operation, trucks receive an unloading time whereupon they are backed to an unloading ramp, the racks with the components thereon are transferred to the in-plant conveyor and move to a stacker arrangement from which the individual panels are connected to the plant overhead trolley arrangement. Completely automated loading and unloading of the trailer speeds the just-in-time inventory system and lessens manpower requirements, providing increased efficiency and cost savings to the assembly plant and its sub-contractors.

To this end, the instant invention provides a conveyor arrangement comprising a pair of free conveyors mounted to a truck trailer floor adjacent the trailer sidewalls and a middle positioned powered conveyor extending parallel to the free conveyors. The powered conveyor is shiftable upwardly and downwardly to selectively engage a conveyor chain with the bottom surface of an article to be conveyed. The direction of movement is selectable for loading or unloading operations. Although particularly adapted for trailer installations, the instant invention may have applications beyond usage in trailers, such as over and under conveyor systems in buildings.

OBJECTS OF THE INVENTION

The principal objects of the present invention are: to provide a conveyor arrangement particularly adapted for loading and unloading truck trailers; to provide such a conveyor arrangement which is positive in operation and evenly moves a powered conveyor upwardly and into engaging contact; to provide such a conveyor arrangement which is adjustable in amount of movement; to provide such a conveyor arrangement having a continuous conveyor chain which is selectible in direction of operation; to provide such a conveyor arrangement which is relatively light in weight and positive in operation; and to provide such a conveyor arrangement which is relatively inexpensive, sturdy and efficient in use and particularly well adapted for the intended purpose.

Other objects and advantages of this invention will become apparent from the following description taken in connection with the accompanying drawings wherein are set forth, by way of illustration and example, certain embodiments of this invention.

DESCRIPTION OF THE DRAWINGS

FIG. 1 is a plan view of a truck trailer, with the top removed, adjacent a manufacturing facility loading dock and having a conveyor arrangement therein embodying the present invention.

FIG. 2 is a fragmentary, side elevational view of the truck trailer with a conveyor arrangement therein.

FIG. 3 is an enlarged, fragmentary, plan view of a portion of the conveyor arrangement.

FIG. 4 is an enlarged, fragmentary view of an end of the powered conveyor.

FIG. 5 is a transverse, sectional view of the powered conveyor showing same in a downward or retracted position, and taken along lines 5—5, FIG. 4.

FIG. 6 is a transverse, sectional view of the powered conveyor showing same in an upward or article engaging position, in sequence of operation after FIG. 5.

FIG. 7 is an elevational view of the powered conveyor.

FIG. 8 is an enlarged, fragmentary view of the powered conveyor showing a conveyor drive means and a means to cause upward shifting of the powered conveyor.

FIG. 9 is a transverse, sectional view taken along lines 9—9, FIG. 8.

FIG. 10 is a transverse, sectional view taken along lines 10—10, FIG. 8.

FIG. 11 is an enlarged, fragmentary, plan view of a portion of the powered conveyor and showing the arrangement of travel limit switches.

FIG. 12 is a longitudinal, sectional view taken along lines 12—12, FIG. 11.

FIG. 13 is a transverse, sectional view taken along lines 13—13, FIG. 11, and showing the powered conveyor in a raised position.

FIG. 14 is a transverse, sectional view taken along lines 14—14, FIG. 11, and showing the powered conveyor in a lowered position.

DESCRIPTION OF THE PREFERRED EMBODIMENT

As required, a detailed embodiment of the present invention is disclosed herein, however, it is to be understood that the disclosed embodiment is merely exemplary of the invention which may be embodied in various forms, therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail: the reference numeral 1, FIGS. 1 and 2, generally indicates a powered conveyor embodying the present invention. The powered conveyor 1 generally has an upwardly shiftable portion carrying a traveling conveyor chain 2 and shifts upwardly and downwardly through travel on a ramp means 3. Mechanism is also included to cause the movement of the powered conveyor 1 and the upward and downward shifting on the ramp means 3, as well as powered rotation of the chain 2 for moving articles into and from a trailer.

In the illustrated example, the powered conveyor 1, FIGS. 1 and 2, is depicted mounted within a trailer 5, as would be normally towed by a truck or tractor. As illustrative of the environment of use of the powered conveyor 1, the truck trailer 5 is shown in FIG. 1 backed adjacent a loading dock 6, such as at a manufacturing or assembly plant, which includes spaced uprights 7 defining a trailer receiving opening. Article receiving conveyors 9 are situated at the loading dock 6 for movement of articles 10 from the trailer 5 and into an area for further processing, such as a stacker or other storage arrangement. The illustrated article 10 is preferably sized to have a longitudinal dimension which accords to the transverse interior dimension of the trailer 5 and may be a pallet, rack, carton or otherwise. In the instance of an automotive assembly plant, the article 10 may be a rack carrying a plurality of interior and exterior panels, windshields or the like for storage and subsequent assembly on the vehicle. Although the drawings show the instant invention mounted in a trailer installation, it is not intended that the invention be limited to use in a trailer, but that this disclosure be construed to include building conveyor installations as well. For example, it is foreseen that the powered conveyor 1 could readily be adapted for use in an over and under conveyor system building installation. In this circumstance, all subsequent references to a trailer floor could be construed as a building floor, or more generally, a plane over which articles are to be conveyed. The term "floor" should be construed to include what are generally referred to as overhead installations and installations above the building structural floor, as in any conveying plane of travel.

The powered conveyor 1 is illustrated extending parallel to and medially positioned on a floor 12 of the trailer 5. As shown in FIG. 8, the floor 12 includes an under flooring consisting of a plurality of transverse I-beams 13 and a lower skin 14 comprising the bottom of the trailer 5. The floor 12 is commonly a wooden floor comprised of oak boards set together side-by-side in the manner of home hardwood flooring.

The trailer conveyor arrangement includes, spaced, parallel, elongate free conveyors 16 and 17, FIG. 1, each containing a plurality of independently rotatable rollers 18 and which are located adjacent the trailer sidewalls 19. The free conveyors 16 and 17 may be conventional in configuration and together they support the articles 10 a distance above the trailer floor 12.

The powered conveyor 1 is located medially between the free conveyors 16 and 17 and in the illustrated example, FIGS. 3 and 7, includes a base support 22 having spaced floor engaging flanges 24 and 25 affixed to the trailer floor 12 and a chain supporting platform 27 movably positioned upon the base support 22. Preferably, the platform 27 is an elongate beam-like arrangement and has spaced, parallel sidewalls 29 and 30 of sturdy, steel plate construction. Sidewalls 29 and 30 are affixed together by a web 31 preferably welded to the interior surfaces of the sidewalls 29 and 30 for rigidity. This configuration results in a generally H-shape in transverse section, FIGS. 5, 6, 13 and 14. The length of the sidewalls 29 and 30 and web 31 is substantially the same length as the floor of the trailer, FIG. 1.

The platform 27, formed of the sidewalls 29 and 30 and web 31 includes the conveyor chain 2 traveling therearound. The conveyor chain 2 is a flexible article engaging means and it is contemplated that equivalents other than a chain may be used as desired, including cables or flexible belts. In the illustrated example, however, a chain 2 is utilized and consists of a multiple side-by-side link arrangement, such as three link sets wide. The chain 2 travels on an upper surface 35 of a platform 27 and returns beneath the platform 27, such as on the base support 22. In the illustrated example, the platform 27 has opposite front and rear ends 37 and 38 with each end fitted with a sprocket 40 rotatably mounted on an axle 41 extending between the sidewalls 29 and 30. The chain 2 travels along the platform upper surface 35 on a wear resistant and smooth bearing surface 43, such as of nylon or other suitable synthetic material secured to the web 31. The chain 2 revolves about the ends 37 and 38 on the respective sprocket 40 and returns on a bottom bearing surface 45, also of nylon or other suitable synthetic material, mounted on the base suppport 22 and likewise extending the length of the platform 27. The chain 2 is powered by a chain drive mechanism, such as shown is FIGS. 8, 9 and 10, described hereinbelow.

A ramp means 50 extends between the base support 22 and the platform 27 for raising and lowering of the platform 27 and chain 2. In the illustrated example, the ramp means 50 has opposed, mating wedge halves including spaced lower wedge halves 52 and 53 secured, as by welding, to the base support 22 and separated from each other a sufficient distance to accommodate the platform 27 sliding therebetween, FIGS. 5 and 6. Upper wedge halves 55 and 56 are secured, as by welding, to the sidewalls 29 and 30 of the platform 27 and are therefore movable with respect to the lower wedge halves 52 and 53. A strip of plastic bearing material 58 is affixed to one or the other of the inclined or ramp surfaces of the wedge halves 52 and 53 or 55 and 56 and facilitates sliding movement therebetween. In the illustrated example, FIGS. 3 and 4, bolts 59 secure the upper wedge halves 55 and 56 to the respective sidewalls 29 and 30, though other means of connection may be utilized as desired. As will be appreciated, the platform 27 is longitudinally slideable on the base support 22 and is guided for longitudinal movement by sliding in a channel defined by the spaced, lower wedge halves 52 and 53.

As shown in FIG. 2, there are a plurality of such ramp means 50, such as four sets, spaced at intervals along the length of the powered conveyor 1. It will also be appreciated that as the platform 27 moves longitudinally forwardly or rearwardly, it raises or lowers, depending upon the direction of movement.

Referring particularly to FIGS. 8, 9 and 10, drive means 62 cause travel of the conveyor chain 2 and a linear actuator means 65 connected to the platform 27, as described below, is operable to shift the platform 27 upwardly and downwardly on the ramp means 50 to move the chain 2 upwardly and downwardly. In the illustrated example, the trailer floor 12 has passages formed therethrough which are preferably located at approximately the longitudinal center of the trailer 5. A motor 68 is suspended beneath the trailer floor 12 by a rigid mounting assembly 69 and includes a right angle drive mechanism 70 driving a sprocket 72. The chain extends downwardly through an opening 73 in the floor 12 and travels about the sprocket 72. Transition sprockets 74 and 75 turn the chain 2 downward from the return path on the bottom bearing surface 45 and direct the chain to the drive sprocket 72. Tensioning means are connected to the chain 2 to maintain tension thereon so that the chain does not jump from the sprockets 72, 74 and 75. An exemplary tensioning means includes a pair of tension sprockets 77 mounted on swingable arms 78 extending from spring loaded rotative mechanisms 79. The tensioning means are affixed to a support 81 extending downwardly from the trailer floor 12. There must be considerable play in the chain 2 to accommodate variances in length as the platform 27 raises and lowers on the ramp means 50. This play will become excessive and cause the chain 2 to jump from engagement with the sprockets 72, 74 and 75 but for the action of the tensioning means described above.

In the illustrated example, the linear actuator means 65 includes a jack screw 83 operated by a motor assembly 84. The jack screw 83 is pinned for swinging movement to a fixed support 85 depending from the trailer floor 12 at one end of the jack screw and has a working end secured to a lever and linkage arrangement, as described below.

Referring to FIGS. 8 and 10, an exemplary lever and linkage arrangement includes a double lever arm 87 swingably affixed at an approximate mid-portion by pivot pins 88 connected to angle flanges 89. The jack screw 83 is swingably mounted to the lower end of the lever arm 87 by a pivot pin and bushing assembly 92. An upper end of the lever arm 87 is swingably affixed by pivot pins 93 to paired linkage arms 95 extending at an acute downward angle and affixed to the respective platform sidewalls 29 and 30. Consequently, when the jack screw 83 extends or retracts, the lever arm 87 swings and either pulls or pushes the linkage arms 95 to cause longitudinal movement of the platform 27. As the platform 27 slides longitudinally it rides upwardly or downwardly on the ramp means 50. As shown in FIG. 8, when the jack screw 83 is caused to extend, a push is exerted by the lever arm 87 on the linkage arms 95 to cause the platform 27 to ride upwardly. The upper wedge halves 55 and 56 slide upwardly on the lower wedge halves 52 and 53 and raise the platform 27 an upward distance to bring the chain 2 into contact with the lower surface of an overlying article 10 and convey same.

Operation of the linear actuator means 55 is independent of actuation of the drive means 62, meaning that the chain 2 can be caused to travel in either direction regardless of the position of the platform 27.

Preferably, the drive means 62 and linear actuator means 65 are mounted in a housing 96, FIG. 2, extending below the trailer 5 and which has an access door for ease of maintenance.

The powered conveyor 1 includes a travel adjustment means, such as in the form of limit switches, FIGS. 11, 12, 13 and 14, which limit downward and upward travel of the platform 27 with respect to the base support 22. In the illustrated example, up and down limit switches are mounted on a support plate 97, normally protected by a cover 98, and which extends outwardly and is approximately medially positioned of the length of the base support 22. One of the limit switches is a down position limit switch 99 and the other is an up position limit switch 100. The limit switches 99 and 100 are electrically powered, as are the drive means 62 and linear actuator 65, and in the illustrated example, include electrical lines 102 appropriately routed through junction boxes and the like. Each of the limit switches 99 and 100 is similar, but opposite in position, and each assembly includes an adjustable stop 104 mounted on a bracket 105 secured to and extending outwardly from the sidewall 30. Each of the limit switches 99 and 100 include a split wedge body 107 and appropriate fasteners (not shown) whereby the wedge body 107 can be adjusted forwardly or rearwardly to move a spring loaded plunger 109 into contact with the adjustable stop 104. The limit switch 99 or 100 is mounted on a support bracket 111 including fasteners 112 of which not only secure the body 107 to the bracket 111 but upon tightening and loosening, the split wedge portions of body 107 can be adjusted laterally to move the plunger 109 forwardly or rearwardly.

Accordingly, the adjustable stop 104 and the adjustable features of the split body wedge body 107 of the switches 99 and 100 provide two means of adjustment for each switch assembly.

For the operation of the switches 99 and 100, reference is made to FIG. 11, wherein the viewer will note that, upon movement of the platform 27 as caused by operation of the linear actuator means 65, the platform 27 will move from left to right and bring the up position limit switch 100 with its plunger 109 into contact with the adjustable stop 104 positioned adjacent thereto. Conversely, when the direction of movement of linear actuator means 65 is reversed, the platform 27 will move from right to left, bringing the down position limit switch 99 into contact of its plunger 109 with the associated adjustable stop 104, as depicted in FIG. 12. Preferably, the limit switches 99 and 100 and their associated stops 104 are adjusted so that there is an upward travel of the platform 27 of approximately one quarter inch. With the angle of the wedge inclines of the ramp means 50, one quarter inch height adjustment generally equates to about one-half inch linear travel of the platform 27.

The dimensions of the powered conveyor 1 to the sidewardly positioned free conveyor 16 and 17 are related so that the plane formed by the upper surface of the rollers 18 of the free conveyors 16 and 17 is slightly above the plane of the surface of the chain 2 traveling on the powered conveyor 1 when the platform 27 is in its downward position, FIGS. 5 and 14. When the linear actuator means 65 is operated to raise the platform 27, the platform raises upwardly so that the chain 2 engages the bottom surface of articles 10 which are supported on their ends on the free conveyors 16 and 17. Upon actuation of the drive means 62, the chain 2 moves the article 10 either inwardly or outwardly of the trailer 5, depending upon the selection of the direction of travel of the chain. As afore stated, the drive means 62 and linear actuator means 65 are conveniently accessible for ease of maintenance and repair within the housing 96 located beneath the trailer 5. Also conveniently located on the trailer 5 are operational switches for actuation of the drive means 62 and 65. These switches (not shown) may be conveniently located on a operator's panel adjacent the rear end of the trailer 5 so that the operator can monitor the loading or unloading operation.

It is to be understood that while one form of this invention has been illustrated and described, it is not to be limited to the specific form or arrangement of parts herein described and shown, except insofar as such limitations are included in the following claims.

What is claimed and desired to be secured by Letters Patent is as follows:

1. A conveyor arrangement for installation in a tractor trailer and comprising:

(a) a pair of free conveyors including non-driven rotating wheels mounted on axles for movement of an article therealong, said free conveyors including means for mounting same on a trailer floor and longitudinal adjacent the respective sidewalls of said trailer;

(b) a powered conveyor means operably separate from and situated between said free conveyors and extending longitudinally of said trailer for selectively engaging and moving articles resting upon said free conveyors; said powered conveyor means comprising:

(i) an elongate base member with inclined surface ramp means therealong;

(ii) a platform beam extending atop said base member and having inclined surface ramp means mating with said ramp means of said base member;

(iii) article supporting means traveling over said platform beam and having drive means therewith for longitudinal movement of said article supporting means; and (iv) actuator means connected to said platform beam for urging said platform beam linearly and shifting same upwardly along said base member and platform beam ramp means, whereby said articles supported by said free conveyors are engaged and carried by said article supporting means.

2. A conveyor arrangement comprising:

(a) a pair of spaced, free conveyors extending longitudinally and having non-driven rotating roller means on axles for movement of an article therealong;

(b) a powered conveyor means operably separate from and situated between said free conveyors and extending longitudinally for selectively engaging and carrying articles resting on said free conveyors; said powered conveyor means including:

(i) an elongate base member with inclined surface ramp means therealong;

(ii) a platform beam extending atop said base member and having inclined surface ramp means mating with said ramp means of said base member;

(iii) article supporting means traveling over said platform beam and having drive means therewith for longitudinal movement of said article supporting means; and (iv) actuator means connected to said platform beam for urging said platform beam linearly and shifting same upwardly along said base member and platform beam ramp means, whereby said articles supported by said free conveyors are engaged and carried by said article supporting means.

3. A conveyor arrangement comprising:

(a) a pair of spaced, free conveyors extending longitudinally and having non-driven rotating means on axles for movement of an article therealong;

(b) a powered conveyor means operably separated from and situated between said free conveyors and extending longitudinally for selectively engaging and carrying articles resting on said free conveyors; said powered conveyor means including:

(i) an elongate base member with inclined ramp surface means therealong and having switch means extending therealong;

(ii) a platform beam extending atop said base member and having inclined surface ramp means mating with said ramp means of said base member;

(iii) article supporting means traveling over said platform beam and having drive means therewith for longitudinal movement of said article supporting means;

(iv) actuator means connected to said platform beam for urging said platform beam linearly and shifting same upwardly along said base member and said platform beam ramp means, whereby said articles supported by said free conveyors are engaged and carried by said article supporting means; and (v) front and rear switch arms extending from said platform beam said switch means extending between said switch arms for limiting fore and aft movement of said platform beam relative to said base member by operable connection to said actuator means for limiting travel thereof.

4. A conveyor arrangement generally for installation in a truck trailer and comprising:

(a) spaced free conveyors including non-driven rotatable rollers and extending longitudinal a distance for conveying articles supported thereby;

(b) a powered conveyor means operably separate from said free conveyors and extending longitudinally therebetween for selectively extending upwardly and engaging articles resting on said free conveyors and transporting same; said powered conveyor means including:

(i) an elongate base member with a plurality of pairs of inclined surface ramp means positioned at intervals along said base member and spaced to provide a channel therebetween;

(ii) an elongate platform beam extending along said channel and atop said base member, and having a plurality of inclined surface ramp means at intervals therealong and mounted on opposite sides of said platform beam so as to have inclined surface to inclined surface sliding contact with said ramp means of said base member;

(iii) article carrier means flexibly traveling over said platform beam and having drive means therewith for longitudinal movement of said article carrier means; and (iv) actuator means connected to said platform beam for urging said platform beam linearly and shifting same upwardly along said base member and said platform beam ramp means, whereby said articles are engaged and carried by said article carrier means.

5. The arrangement set forth in claim 4 wherein:

(a) said conveyor arrangement is mounted within a truck trailer; and (i) said drive means include a motor and tensioners mounted below a trailer floor;

(ii) said actuator means include a linear actuator mounted below said trailer floor and connected to said platform beam via a lever arm extending upwardly through said floor.

6. The arrangement set forth in claim 5 wherein:

(a) said drive means and actuator means are enclosed within a housing box situated beneath the floor of said trailer and accessible from outside the trailer.

* * * * *